United States Patent
Hartikka et al.

(10) Patent No.: US 8,624,509 B2
(45) Date of Patent: Jan. 7, 2014

(54) LED TUBE AND LAMP ARRANGEMENT

(75) Inventors: Yrjö Hartikka, Pennala (FI); Jouko Kuisma, Lahti (FI)

(73) Assignee: Teknoware Oy, Lahti (FI)

( * ) Notice: Subject to any disclaimer, the term of this patent is extended or adjusted under 35 U.S.C. 154(b) by 321 days.

(21) Appl. No.: 13/092,187

(22) Filed: Apr. 22, 2011

(65) Prior Publication Data

US 2011/0260614 A1    Oct. 27, 2011

(30) Foreign Application Priority Data

Apr. 23, 2010  (FI) .................................... 20105447

(51) Int. Cl.
*H05B 37/02*    (2006.01)

(52) U.S. Cl.
USPC ............ 315/186; 315/294; 315/210; 315/320

(58) Field of Classification Search
USPC ......... 315/186, 210, 193, 294, 295, 297, 299, 315/301, 307, 320
See application file for complete search history.

(56) References Cited

U.S. PATENT DOCUMENTS

| | | | |
|---|---|---|---|
| 7,441,922 B2 | 10/2008 | Huang et al. | |
| 7,611,260 B1 | 11/2009 | Lin et al. | |
| 8,314,564 B2 * | 11/2012 | Yu et al. | 315/185 R |
| 2007/0183156 A1 | 8/2007 | Shan | |
| 2007/0223225 A1 * | 9/2007 | Eiich et al. | 362/260 |
| 2009/0237007 A1 | 9/2009 | Leng | |
| 2010/0002439 A1 | 1/2010 | Lin et al. | |

FOREIGN PATENT DOCUMENTS

| | | |
|---|---|---|
| AU | 2009101044 A4 | 11/2009 |
| CN | 101737664 A | 6/2010 |
| EP | 1 852 648 A1 | 11/2007 |
| EP | 2 151 620 A1 | 2/2010 |
| FI | 64487 B | 7/1983 |
| GB | 2465966 A | 6/2010 |
| JP | 2010-92990 A | 4/2010 |
| WO | 2009/067074 A1 | 5/2009 |
| WO | 2009/131340 A2 | 10/2009 |

* cited by examiner

*Primary Examiner* — Daniel D Chang
(74) *Attorney, Agent, or Firm* — Birch, Stewart, Kolasch & Birch, LLP

(57) ABSTRACT

A LED tube includes a translucent or fluorescent tube of substantially the shape and size of a fluorescence tube, inside which one or more LED components and a current control unit are installed. At both ends of the LED tube, there is a pair of contact pins for connecting the light element mechanically and electrically to the tube holders of the fluorescence tube lighting fixture. The tube lamp has a safety unit arranged to prevent a voltage from transferring through the tube lamp from its one end to the other until a voltage supplied from the corresponding tube holder of the lighting fixture to the pair of contact pins has been separately detected at each end of the tube lamp. Inside the LED tube, there is at least one optical line that is arranged to transfer a control or measurement signal associated with the safety unit from one end of the LED tube to the other without capacitive leakage currents.

20 Claims, 5 Drawing Sheets

$$U_1 = \frac{R_1}{R_1 + R_2 + R_3} \cdot U_{in}$$

$$U_2 = \frac{R_2}{R_1 + R_2 + R_3} \cdot U_{in}$$

LED TUBE AND LAMP ARRANGEMENT

BACKGROUND OF THE INVENTION

The invention relates to lamps and, in particular, to LED tubes which have one or more LEDs as light sources and which can replace a fluorescent tube.

Fluorescent lamps are widely used in different objects, such as in homes, offices and industry. Fluorescent lamps are more durable, economical and efficient than incandescent lamps, in which most of the electric power turns into heat instead of light. In a traditional fluorescent lamp, the body is a straight tube with a length of 15 to 60 times the diameter of the tube. The tube may also be bent, in which case it may be of almost any shape. Fluorescent tubes are low-pressure mercury discharge lamps in which the inner surface of the tube is coated with fluorescent material. The structure of a fluorescent tube is very simple and is illustrated in FIG. 1A. The lamp consists of an air-tight glass tube 4 containing a small amount of mercury, an inert gas, a fluorescent coating (luminophor), such as phosphor, and electrodes 2 and 3. At each end of the fluorescent tube, there is a lid 5 or 6 with two symmetrically positioned contact pins 7 and 8 or 9 and 10, to which the electrode 2 or 3 is connected. Power supply to the fluorescent tube is provided via these contact pins 7 and 8; 9 and 10. When the lamp is in operation, the temperature of the electrodes 2 and 3 must be sufficiently high, so that electrons release from them. A fluorescent lamp does not go on at a normal operating voltage without preheating. It is typical of fluorescent tubes (EN 60081) that their cathodes are heated with separate preheat circuits or arrangements. On the other hand, after the lamp has gone on, the discharging current through the tube must be restricted, so that the tube will not be damaged. Therefore, all fluorescent tubes require some kind of ballast. Conventionally, the ballast has been a ballast-starter combination, which is illustrated in FIG. 1B. When mains voltage (e.g. 230 VAC) is switched on to the lighting fixture, the resistance through the tube is very high, and the electric current goes through a ballast L, the electrode 3, a closed starter 11, and the electrode 2. When going through the electrodes 2 and 3, the electric current heats the electrodes, causing them to emit electrons which ionize the gas inside the tube. The ionized gas forms a current path through the tube. The current going through the ballast L generates a magnetic field in the ballast. When, after a moment, the starter 11 opens, the magnetic field of the ballast L generates a high voltage between the electrodes 2 and 3, which switches the lamp on.

Nowadays, electronic ballasts are also used. The electronic ballast also responsible for lighting up the lamp, so there is no need for a separate starter. A preheating arrangement is provided by either separate preheating windings or a starter capacitor. This is illustrated in FIG. 1C. An electronic ballast 12 connected to the mains voltage (e.g. 230 VAC) provides a continuous electric current through each of the electrodes 2 and 3. These electric currents are configured in such a way that a voltage difference is generated between the electrodes 2 and 3. When mains voltage is connected to the ballast 12, the electric current that goes through the electrodes heats them quickly, and the emitted electrons ionize the gas in the tube. The gas having ionized, the voltage difference between the electrodes starts a gas discharge.

The intention is to replace fluorescent tubes with LED tubes having the same length and values. In these, the physical dimensions are the same as in straight fluorescent tubes (e.g. T8 with a diameter of 26 mm and a length of 60 or 120 cm), whereby the fluorescent tube could be directly replaced with a LED tube in an existing fluorescent lamp. Examples of LED tubes directly connectable to the mains with a ballast are disclosed in publications EP1852648 and U.S. Pat. No. 7,441, 922. Examples of LED tubes equipped with an electronic ballast are disclosed in publications FI64487 and US2007/0183156. The electronic ballast usually supplies a high-frequency (20 kHz . . . 100 kHz) voltage to the fluorescent tube pins, and the control electronics of the LEDs rectify the voltage and limit the current to the LEDs appropriately. Other examples of LED tubular lighting fixtures are disclosed in publications US2010/0002439 and WO2009/131340. The aim is to achieve a long lifetime for the light source as well as improved luminous efficiency (amount of light/electric energy).

In practice, the intention is to replace a fluorescent tube with a LED tube without changing the lighting fixture structures. Some of the LED tubes work directly with a fluorescent tube ballast, in which case only the starter should be removed from service. Then, the LED tube can be replaced easily and without assistance from a professional.

This causes a few problems, the most significant of which is the risk of an electric shock during the mounting step of the LED tube. FIG. 2 shows a simplified conceptual drawing of a fluorescent tube lighting fixture 20 comprising a body 24 with required electric structures therein, such as the ballast/ballast 12 and the starter 11 that is usually required only in connection with a ballast. At the ends of the lighting fixture, there are tube supports 21 and 22 with contact caps 23 into which contact pins of ends 26 and 27 of a tube 25 are inserted to achieve mechanical and electric connection. According to the safety regulations in the field of electricity, lighting fixtures are to be constructed in such a way that, when a fluorescent tube is replaced, it is not possible for a user to touch any parts at the mains voltage even if the lighting fixture were carrying voltage. This requirement is met even if the fluorescent tube were replaced in such a way that only one end 27 of the tube 25 were in contact with the contacts 23 of the tube support 22 and the person replacing the tube can touch the other end 26 of the tube. This requirement is met because no current goes through the gas-filled fluorescent tube before the gas in the tube is ionized with a starting pulse. In other words, the gas in the fluorescent tube serves as an insulator in itself. The electric structure of the lighting fixture, in turn, is such that generation of a starting pulse requires that both ends of the tube be connected to the contacts of the tube support. This way the fluorescent tube prevents the risk of an electric shock during replacement.

With LED tubes, this electric safety requirement is not met. Inside LED tubes, there is a printed board or a corresponding structure, on which LEDs and electronic current supply components they require are mounted. The purpose of these components is to convert the alternating voltage of the mains into direct voltage and to regulate the direct current required by the LEDs. In practice, current flows through these components once voltage is applied to them, in other words, the LED tube is in a conductive state without a separate starting pulse. Therefore, in a practical situation, when the LED tube 25 is being mounted on a fluorescent tube lighting fixture 20, the contact pins 27 at one end of the LED tube 25 may hit the contacts 23 of the tube support 22, and the other end 26 of the tube may remain outside the lighting fixture, so that the person mounting or replacing the tube may touch it, whereby s/he is prone to the risk of an electric shook.

Another factor deteriorating electric safety is the cooling of a LED tube. Since the service life of LEDs is highly dependent on their operating temperature, various solutions have been sought for cooling such a LED tube. Some solutions suggest perforating the LED tube (e.g. U.S. Pat. No. 7,611, 260), whereby air flows through the holes transferring heat from the LEDs out of the tube. In such a solution, owing to the plastic body of the LED tube, high insulation level of the live parts is still maintained.

Another cooling solution is disclosed in publications EP2161620 and US 2007/0183156, where part of the LED tube is of metal which serves as a good heat conductor and transfers heat out of the LEDs. A problem with these cooling solutions using metal is that the metallic cooling part must be insulated sufficiently reliably from the LED circuits. Thus, sufficient insulation distances are required. If such LED tubes with a metallic cooling part are used such that they are fed by an electronic ballast, a high frequency, in particular, causes a further problem. That is to say, the conductor circuits of the LEDs generate stray capacitance in said metal cooling structure, which generates a capacitive leakage current. This leakage current may cause the risk of an electric shock which may even be life-threatening.

BRIEF DESCRIPTION OF THE INVENTION

An object of the invention is thus to provide a LED tube and an lighting fixture arrangement with which one or more of the above electric safety problems can be solved. The object of the invention is achieved by the LED tube and arrangement according to the independent claims. Preferred embodiments of the invention are disclosed in the dependent claims.

One feature of the invention is a LED tube comprising a translucent or fluorescent tube of substantially the shape and size of a fluorescence tube, inside which one or more LED components and a current control unit are installed and at each end of which there is at least one contact pin for connecting the LED tube mechanically and electrically to the tube supports of the fluorescence tube lighting fixture. The LED tube comprises a safety unit arranged to connect electric power from the ends of the LED tube to the current control unit and/or LED components only after the voltage fed from the corresponding tube support of the lighting fixture to said at least one contact pin has been detected at each end of the LED tube separately. LED tubes have at least one optical control line arranged to transfer at least one control or measurement signal associated with said safety unit from one end of the LED tube to the other, opposite end.

According to an embodiment, the safety unit comprises switching means on a current path between contact pins at different ends of the LED tube, and said at least one optical control line is arranged to transfer at least one control or measurement signal associated with the control of said switching means.

According to an embodiment, the safety unit comprises switching means in series on a current path between said at least one contact pin at the first end of the LED tube and the current control unit, and said at least one optical control line is arranged to transfer the control or measurement signal associated with the control of said switching means from the opposite, second end of the LED tube to the first end.

According to an embodiment, the safety unit comprises a first voltage detection means connected to detect voltage at said at least one contact pin at the first end of the LED tube and to control said switching means, and a second voltage detection means connected to detect voltage at said at least one contact pin at the second end of the LED tube and to control said switching means at the opposite, first end of the LED tube, whereby said at least one optical control line is arranged to transfer a signal from said second voltage detection means to said switching means.

According to an embodiment, the safety unit comprises switching means in series on a current path at both ends of the LED tube between said at least one contact pin and current control unit. The control of the switching means is cross-connected in such a way that detection of voltage at one end of the LED tube is arranged to control the electric power switching means at the opposite end. Said at least one optical control line is arranged to transfer cross-connected control or measurement signals associated with the control of said switching means between the ends of the LED tube.

According to an embodiment, said at least one optical control line comprises a first optical line arranged to transfer a voltage measurement or control signal of the connection from the first end of the LED tube to the opposite, second end, and a second optical line arranged to transfer voltage measurement or control signal of the connection from the second end of the LED tube to the opposite, first end.

In accordance with an embodiment, the safety unit comprises
a first and a second controlled switching means at a first and at a second end of the LED tube, respectively, for supplying electric power to the current control unit and/or to the LED components,
a first voltage detection means connected to detect voltage in said at least one contact pin at the first end of the LED tube,
a first optical line, with which the first voltage detection means is connected to control said second switching means at the opposite, second end of the LED tube,
a second voltage detection means connected to detect voltage in said at least one contact pin at the second end of the LED tube, and
a second optical line, with which the second voltage detection means is connected to control said first switching means at the opposite, first end of the LED tube.

In accordance with an embodiment, the safety unit is arranged to detect the heating voltage received from the tube support of the fluorescent tube lighting fixture to the contact pins at both ends of the LED tube.

In accordance with an embodiment, the LED tube comprises two contact pins at each end of the tube, and between these two contact pins at each end of the LED tube, a resistive, inductive and/or capacitive measuring component is connected to provide a current path between the contact pins. The safety unit is arranged to detect low voltage over said measuring component at each end of the LED tube, the low voltage resulting from the current flowing through the measuring component and generated with a high-resistance component connected in place of or parallel with in a ballast-starter-type fluorescent tube lighting fixture.

According to an embodiment, said at least on optical control line is arranged to transfer a signal associated with the control of the LED components and/or current control unit.

According to an embodiment, said at least one optical control line comprises
an electro-optical converter that converts the electrical signal to be transferred to an optical signal,
an opto-electrical converter that converts the transferred optical signal to an electrical signal, and
an optical wave guide mounted between the electro-optical and opto-electrical converters.

According to an embodiment, said at least one optical control line comprises an opto-isolator or a corresponding component that is arranged to isolate an electrical control wire from a live end.

In accordance with an embodiment, part of the tube coating of the LED tube lighting fixture is made of metal or comprises a metal structure to provide cooling.

A second feature of the invention is an lighting fixture arrangement comprising an lighting fixture intended for a fluorescent tube and having a LED tube according to an embodiment of the invention mounted on it.

The embodiments of the invention help prevent a situation where only one end of the LED tube is connected to the live parts of the lighting fixture and where the person mounting the tube lamp may obtain an electric shock through the LED tube from the yet unmounted end. The optical signal line(s) according to the embodiments of the invention reduce or prevent stray capacitance from the measuring and/or control conductors running inside the LED tube and connected to the safety unit to the touchable metal parts, such as the cooling element, of the LED tube. This further reduces the risk of an electric shock during installation.

In the embodiments of the invention that apply cross-connection of control, voltage cannot be connected to the LED circuitry during mounting before both ends of the LED tube have been mounted on the lighting fixture and energized. A live LED circuitry, particularly when implemented on a circuit board, generates significant stray capacitance and leakage current to the metal parts or body of the tube lamp. This stray capacitance may be relatively high because the tube itself is thin and does not allow structurally great distances between the conductors and the body. The leakage current, in turn, may cause the risk of an electric shock when the LED tube is being mounted. If the detection of voltage at one end of the tube caused connection of voltage to the LED circuitry at the same end even if the other end of the tube were not mounted yet, the live LED circuitry would cause stray capacitance and the risk of an electric shock for the person mounting the tube.

In the embodiments of the invention to which cross-connection of control is applied, detection of voltage at one ("hot") end of a LED tube results in the connection of the dead ("cold") end to the LED circuitry. The dead LED circuitry then does not cause stray capacitance and leakage current to the metal parts or body of the tube lamp. The LED circuitry becomes live only after both ends of the LED tube have been mounted on the lighting fixture, i.e., when the second "cold" end also becomes live ("hot"). When the cross-connected control signals are transferred optically, the stray capacitance caused by the control conductors is also avoided.

BRIEF DESCRIPTION OF THE FIGURES

The invention will now be described in greater detail by means of preferred embodiments with reference to the accompanying drawings, in which.

DESCRIPTION OF EXEMPLARY EMBODIMENTS OF THE INVENTION

The area of application of the invention encompasses all lamps, particularly tube lamps which have one or more LEDs as the light source and with which a fluorescent tube lighting fixture or the like can be replaced.

Figure 3A:
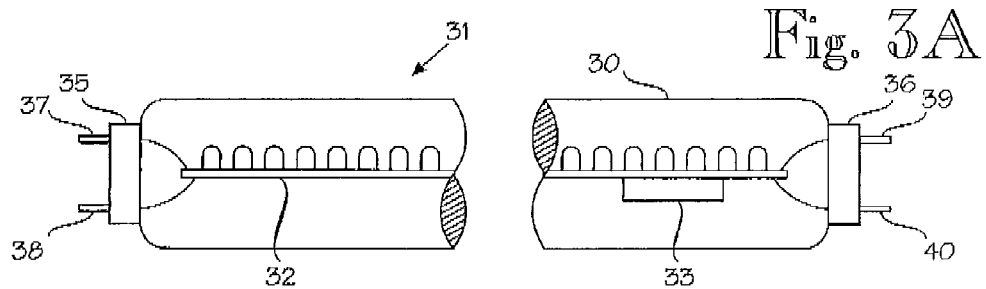
FIGS. 3A, 3B and 3C show simplified examples of the mechanical structure of a LED tube.

FIG. 3A illustrates a simplified example of a potential structure of a LED tube. The lamp 31 consists of a straight (or bent) tube 30 which is of suitable translucent material, such as glass or plastic, or possibly of fluorescent material. The tube 30 does not have to be air-tight. On the contrary, there may be openings, holes, and/or slots for providing air circulation and cooling (e.g. U.S. Pat. No. 7,611,260), whereby the air flows through these holes and transfers heat out of the LEDS outside the tube. In such a solution, owing to the LED tube body made of plastic or other insulation material, high insulation level of the live parts is still maintained.

Figure 3B:
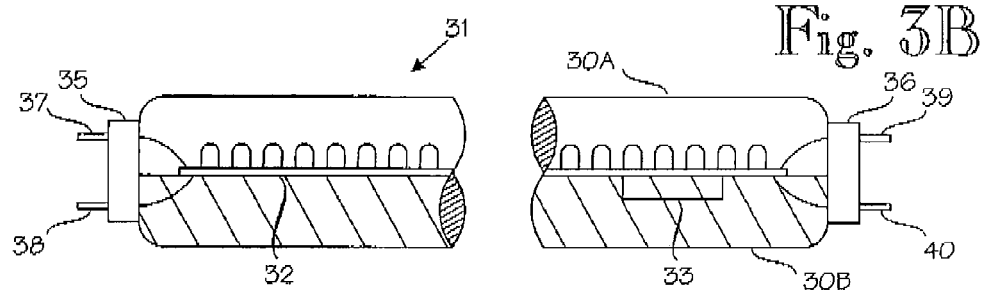
Figure 3C:
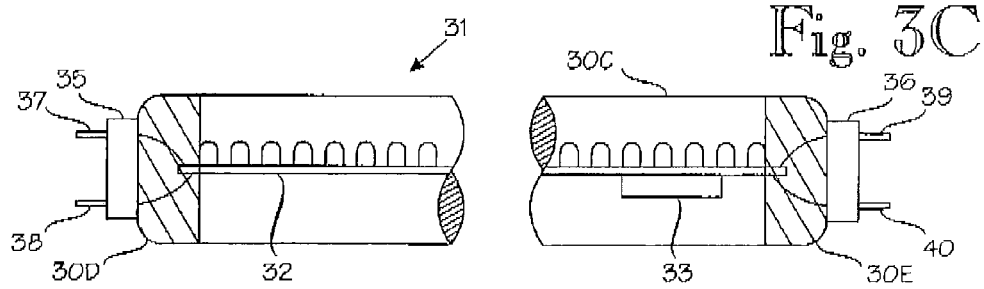

Alternatively, part of the tube coating of the LED tube may be made of metal or comprise a metal structure to provide cooling. Metal acts as a good heat conductor and conducts heat away from the LEDs and the inside of the LED tube to the surrounding air. FIGS. 3B and 3C show examples of LED tubes equipped with a metal cooling element. In FIG. 3B, the tube forming the coating of the LED lamp is formed of two portions 30A and 30B. Portion 30A is of an appropriate translucent material, such as glass or plastic, or possibly of a fluorescent material (in the same way as the whole tube in FIG. 3A). Portion 30A is of metal and forms a cooling element. In the example of FIG. 3B, portions 30A and 30B are symmetrical tube halves relative to the longitudinal axis of the tube and when joined together they form a cylindrical uniform tube. Portions 30A and 30B may also be longitudinally asymmetric in a required manner depending on the volume of necessary cooling or the size of the illumination sector, for example. The cross-sectional profiles of portions 30A and 30B may also differ in other ways from each other; for instance, the profile of portion 30A may be a half-circle and that of portion 30B may be rectangular. It is also possible that portions 30A and 30B overlap slightly. Another possibility is that the tube according to FIG. 3A forms portion 30A, and portion 30B is a separate metal element located as a casing over tube 30A. In the example of FIG. 3C, the tube forming the coating of the LED lamp is formed of three tubular portions 30C, 30D, and 30E. Middle portion 30C is of suitable translucent material, such as glass or plastic, or possibly of fluorescent material (in the same way as the whole tube in FIG. 3A). End portions 30D and 30E are of metal and form cooling elements. Tube portions 300, 30D, and 30E form a full-sized cylindrical tube when connected one after the other. It is also possible that portions 30D and 30E overlap slightly with portion 30C. Another possibility is that tube 30 according to FIG. 3A forms portion 30C, and portions 30D and 30E are separate metal elements located as casings or end sleeves over tube 30C. More examples of LED tubes equipped with metal cooling elements are disclosed in publications EP2151620 and US 2007/0183156.

Figure 3D:
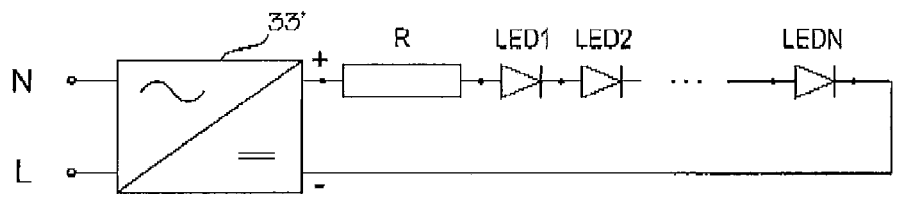
FIG. 3D is a simplified circuit diagram showing an example of the LED circuit of the LED tube of FIG. 3A and its current supply.

Inside tube 30 (tube 30A-30B or 300-30E, respectively), there is a printed circuit board 32 or a corresponding structure, on which LED (Light Emitting Diode) components 34 and electronic current supply components 33 they require are mounted. The purpose of these components 33 is to convert the alternating voltage (e.g. 230 VAC) of the mains to direct voltage (dc) and to regulate the dc current required by the LEDs 34. FIG. 3D shows an example of a potential LED circuit of the LED tube of FIG. 3A and its current supply. In FIG. 3D, the phase voltage (L) of the mains and zero (N) are connected to the rectifier circuit 33' that generates direct voltage. A LED chain with N LEDs in series, wherein N=1, 2, ..., is connected to the direct voltage through a current-limiting series resistor R. The series resistor R shown in FIG. 3D can be replaced by an electronic (preferably low-loss) switched mode solution.

Both ends of tube 30 (tube 30A-30B or 30C-30E, respectively) are closed by a lid 35 or 36 with two symmetrically positioned contact pins 37 and 38 or 39 and 40. Power supply to the current supply components 33 on the circuit board 32 is carried out via these contact pins 37 and 38; 39 and 40. It should be noted that the internal structure and electrical implementation of a LED tube are not significant to the invention, and the safety solution according to the embodiments of the invention may be applied to implementations of different type. The mechanical dimensions of the LED tube, at least its length and the number, locations and dimensions of the contact pins, are preferably substantially same as those of the fluorescent tube which is to be replaced, so that the fluorescent tube can be directly replaced by the LED tube in an existing fluorescent tube lighting fixture. The LED tube 31 can be matching in dimensions with a T8 tube lamp, for instance, the diameter of which is approximately 26 mm and length 60 cm or 120 cm, for example. According to an embodiment of the invention, the LED tube is intended to replace a fluorescent tube with only one contact pin at each end (single pin tube). A tube such as this may be a cold cathode fluorescent tube, in which the electrode has no pre-heating.

Figure 2:
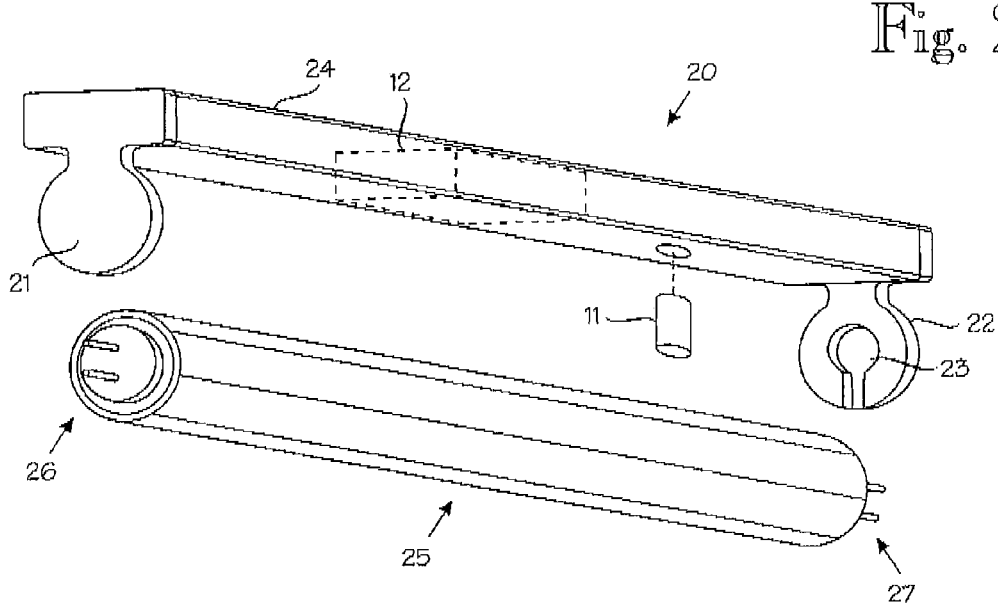
FIG. 2 shows a simplified example of the structure of a fluorescent tube lighting fixture.

As described above, if the LED tube 31 shown in FIG. 3A, for example, is installed in the lighting fixture 20 of FIG. 2, the contact pins 39 and 40 of the tube lamp 31 may be in the contact caps 23 of the tube support 22 that has mains voltage. Then again, the contact pins 37 and 38 of the opposite end of the tube lamp 31 may still be outside the lighting fixture 20 and exposed to the touch of the person installing the lamp. A dangerous voltage may transfer from the contact pins 39 and 40 via the structures, such as circuit board 32, LEDs 34 and/or current supply components 33, inside the tube 30 (tube 30A-30B or 30C-30E, respectively) to the contact pins 37 and 38.

Also, if the tube casing of the LED tube has a metal structure for providing cooling (as is the case in the examples of FIGS. 3B and 3C), a problem arises from the fact that metal is also a conductor of electricity, whereby the metal, touchable outer parts of the tube increase the risk of an electric shock. Therefore, a metal cooling part needs to be isolated sufficiently reliably from the LED circuits. Sufficient insulation distances are then required. If such LED tubes with a metallic cooling part are used such that they are fed by an electronic ballast, the high frequency of the fed voltage causes a further problem. That is to say, the conductor circuits of the LEDs generate to the alternating voltage, especially high-frequency voltage (>1 kHz, preferably higher than 10 kHz), stray capacitance in said metal cooling structure, which generates a capacitive leakage current. This leakage current may cause the risk of an electric shock which may even be life-threatening. Capacitive leakage currents of this type may be generated in metal structures close to the tube lamp even in the LED tubes of the type shown in the example of FIG. 3A.

Figure 4A:
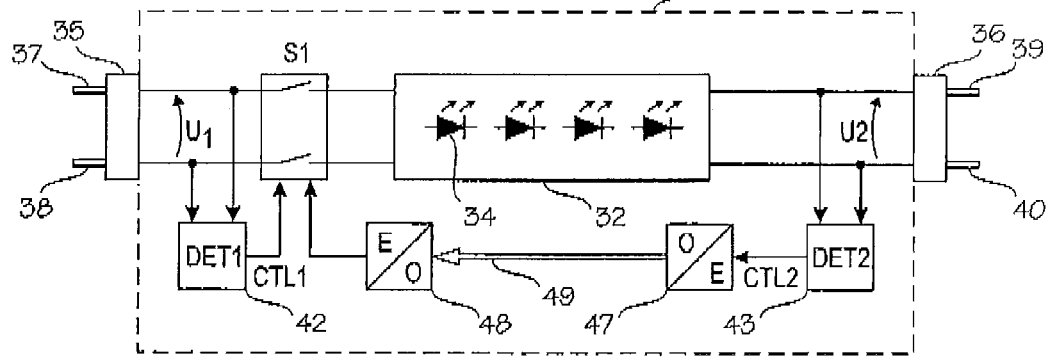
FIG. 4A is a schematic representation of a LED tube according to an exemplary embodiment of the invention.

FIG. 4A is a schematic representation of a LED tube 41 according to an exemplary embodiment of the invention. The LED tube 41 may be similar in mechanical and electric structure to the tube lamp 31 of FIG. 3A, 3B, or 3C, for instance, with the exception that the LED tube 41 is also equipped with a safety circuit according to an embodiment of the invention to remove the risk of an electrical shock to the person doing the installation. The components of the safety circuit may preferably be on the same printed board 32 or a corresponding structure as the LEDs 34 and other current supply components 33.

As described above in connection with FIG. 1C, an electronic ballast 12 supplies the heating voltage of the electrodes via two conductors directly to both ends of the fluorescent tube 1, more specifically to the contact pins 7, 8, 9, and 10 in them. The operating voltage of the fluorescent tube 1 is formed between these heating voltages, whereby the heating voltages are of a different potential. If the lighting fixture 20 of FIG. 2 contains such an electronic ballast (in which case it does not have a starter 11), these heating voltages are also available at the contact caps 23 of the tube supports 21 and 22.

Some embodiments of the invention utilize these directly supplied, low heating voltages as detection voltages of the safety circuit. In the example of FIG. 4A, voltage detectors (DET1) 42 and (DET2) 43 are arranged inside the tube 30 (tube 30A to 30B or 30C to 30E, respectively) of the LED tube 41. The voltage detector 42 is connected to detect (measure) heating voltage U1 between the contact pins 37 and 38 at the first end of the LED tube 41. The voltage detector 42 activates a control signal CTL1, when heating voltage U1 is detected. Correspondingly, the voltage detector 43 is connected to measure heating voltage U2 between the contact pins 39 and 40 at the other end of the LED tube 41. The voltage detector 43 activates a control signal CTL2, when heating voltage U2 is detected. In addition, to the current supply circuit of the LED tube 41, at least one circuit-breaking switch S1 is added to open (break) or close (connect) the current circuit of the LED tubular lighting fixture under the control of the control signals CTL1 and CTL2 and, thus, to prevent or allow the conduction of a dangerous voltage through the tube lamp from one end to the other. The circuit-breaking switch S1 is open when the tube lamp 41 has not been installed in the lighting fixture, in other words, when neither voltage detector 42 nor 43 detects heating voltage U1 and U2, respectively. The circuit-breaking switch S1 is also open when only one end of the LED tube 41 is installed in the contact cap of the lighting fixture, in other words, when only one of the voltage detectors 42 and 43 detects heating voltage U1 or U2, respectively. The circuit-breaking switch S1 only closes if both ends of the LED tube 41 are installed correctly in the tube supports of the lighting fixture and both voltage detectors 42 and 43 detect heating voltage U1 and U2, respectively, from the lighting fixture. This prevents a situation where only one end of the LED tube 41 is connected to the live parts of the lighting fixture and where the person mounting the LED tube may receive an electric shock through the LED tube.

In the example of FIG. 4A, the control signal CTL1 generated by the voltage detector 42 is taken as an electric control to the circuit-breaking switch S1. The control signal CTL2 generated by the voltage detector 43 is instead taken to the circuit-breaking switch S1 through an optical link. For this, the electric control signal CTL2 is converted to an optical signal in an electro-opto (E/O) converter 47, transferred by means of the optical wave guide 49, such as optical fiber, to the opposite end of the LED tube 41 to an opto-electro (O/E) converter 48 that converts the optical control signal to an electric control signal to be used to control the circuit-breaking switch S1. The use of an optical link reduces capacitive leakage currents from the control conductor into metal cooling structures, for example, such as to tube portions 305, 30D, and 30E in FIGS. 3B and 3C. Similarly, signal lines associated with the operation of the LED components 34 and/or the current control unit may be implemented with optical signal lines to reduce capacitive leakage currents.

Figure 4B:
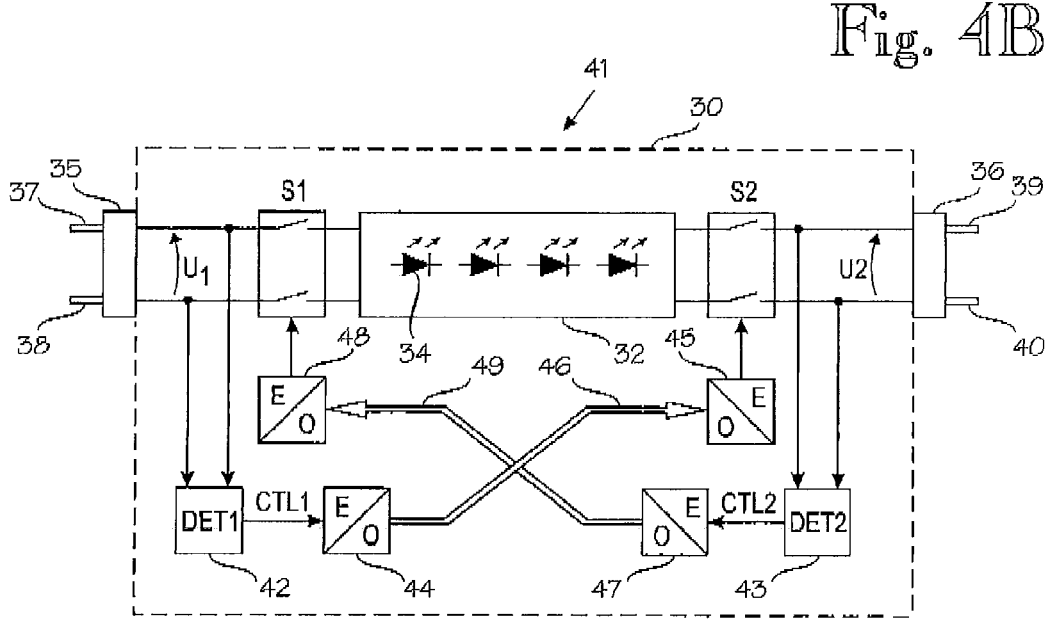
FIG. 4B is a schematic representation of a LED tube according to an exemplary embodiment of the invention that has a circuit-breaking switch at both ends of the LED tube and their control is cross-connected between the ends of the LED tube.

In the example of FIG. 4B, the LED tube 41 is also equipped with a safety circuit according to an embodiment of the invention to remove the risk of an electric shock to the person installing the lamp. The safety circuit differs from the example of FIG. 4A in that an isolating switch S1 is added to one end of the LED tube 30 (tubes 30A-30B or 30C-30E, respectively) in connection with the current supply circuit of the LED tube 41 and an isolating switch S2 is added to the other end. These switches open (disconnect) or close (connect) the current circuit of the LED tube lighting fixture under the control of the control signals CTL and CTL2, and thereby prevent or allow conduction of a dangerous voltage through the tube lamp from one end to the other. The isolating switches S1 and S2 are open when the tube lamp 41 has not been installed in the lighting fixture, in other words, when neither of the voltage detectors 42 and 43 detects heating voltage U1 and U2, respectively. One of the isolating switches S1 and S2 is open and the other one closed when only one end of the LED tube 41 is installed in the contact cap of the lighting fixture, in other words, when only one of the voltage detectors 42 and 43 detects heating voltage U1 or U2, respectively. This way, the open circuit-breaking switch prevents the uninstalled end from being energized. Each circuit-breaking switch S1 and S2 only closes if both ends of the LED tube 41 are installed correctly in the tube supports of the lighting fixture and both voltage detectors 42 and 43 detect heating voltage U1 and U2, respectively, from the lighting fixture. This prevents a situation where only one end of the LED tube 41 is connected to the live parts of the lighting fixture and where the person mounting the LED tube may receive an electric shock through the LED tube.

In the example of FIG. 4B, the controls of the circuit-breaking switches S1 and S2 are cross-connected between the ends of the LED tube 41 such that the detection of voltage U1 at the end of the LED tube 41 with the circuit-breaking switch S1 is arranged to control the electric power circuit-breaking switch 52 at the opposite end, and the detection of voltage U2 at the end of the LED tube 41 with the circuit-breaking switch S2 is arranged to control the electric power circuit-breaking switch S1 at the opposite end. Thus, voltage detection at one ("hot") end of the LED tube causes coupling of the dead ("cold") end to the LED circuitry. Dead LED circuitry does not cause stray capacitance and leakage current to the metal parts or body of the tube lamp. The LED circuitry becomes live only after both ends of the LED tube have been mounted on the lighting fixture, in other words, when the second, "cold" end also becomes live ("hot"). In the example of FIG. 4B, the control signals CTL1 and CTL2 are taken to the circuit-breaking switches S2 and S1 through optical links. For this, the electric control signals CTL1 and CTL2 are converted to optical signals in the electro-opto (E/O) converters 44 and 47, respectively, transferred by means of the optical wave guides 46 and 49, respectively, such as optical fibers, to the opposite end of the LED tube 41 to the opto-electro (O/E) converters 45 and 48, respectively, that convert the optical control signals to electric control signals to be used to control the circuit-breaking switch S1 and S2, respectively. The implementation of control cross-connection reduces (or completely eliminates) capacitive leakage currents from the control conductor into metal cooling structures, for example, such as to the tube portions 30B, 30D, and 30E in FIGS. 3B and 3C. Similarly, signal lines associated with the operation of the LED components 34 and/or the current control unit may be implemented with optical signal lines to reduce capacitive leakage currents.

Figure 1A:
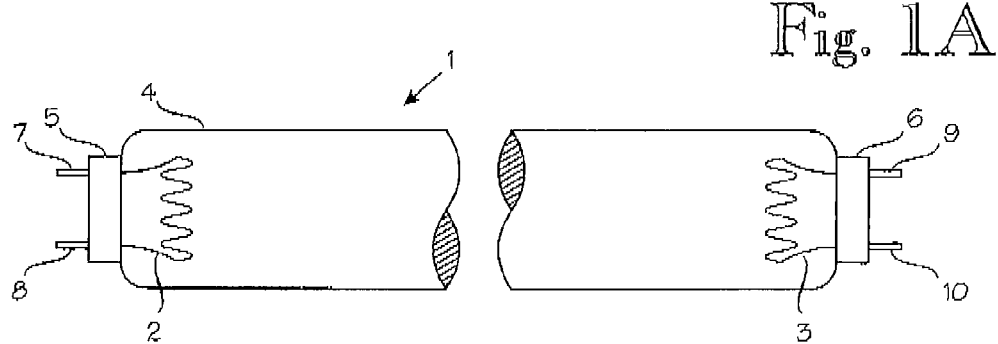
FIG. 1A shows a simplified example of the mechanical structure of a fluorescent tube.
Figure 1B:
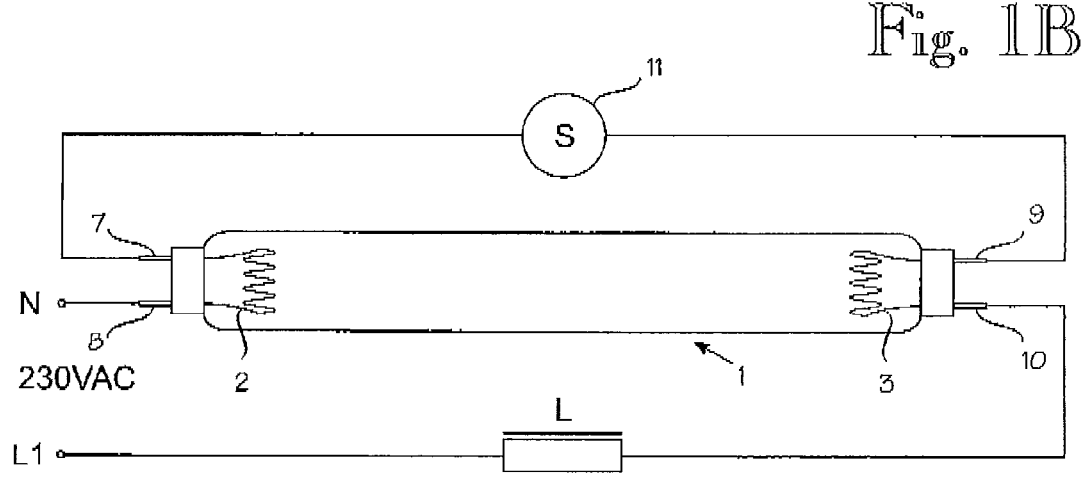
FIG. 1B shows an example of the electric circuitry of a fluorescent tube when the ballast is implemented with a ballast-starter combination.
Figure 1C:
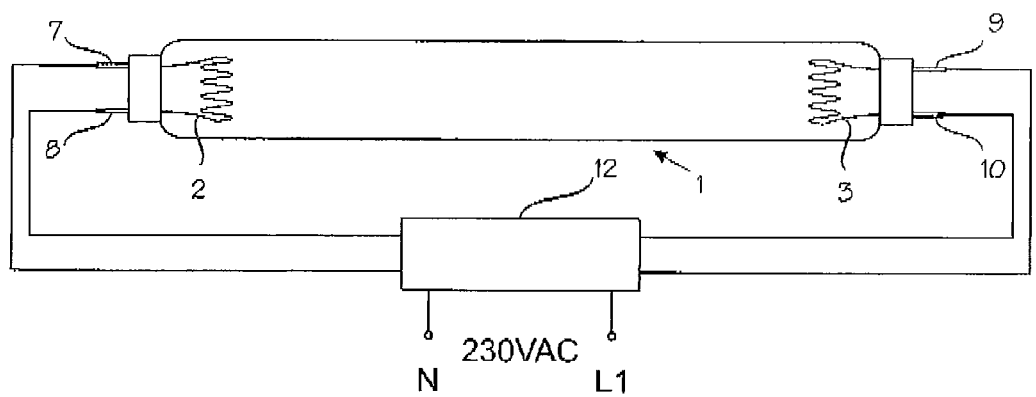
FIG. 1C shows an example of the electric circuitry of a fluorescent tube when an electronic ballast is used.

Conventional ballast-starter circuits do not have separate heating voltages and the preheating of the fluorescent tube is achieved by a momentary current pulse from the ballast-starter circuit, as described in connection with FIG. 1B. In a fluorescent tube lighting fixture that uses such a ballast-starter circuit, there are no separate heating voltages for the contact pins 37, 38, 39, and 40 of both ends of the LED tube 41, and the supply voltage of the lighting fixture to the contact pins 37, 38, 39, and 40 of both ends arrives through the ballast 12. In such an lighting fixture, the detection circuits 42 and 43 of the LED tube according to FIGS. 4A and 4B should detect (measure) mains voltage or some other supply voltage by high-resistance in the contact pins of the ends of the LED tube. This means that the risk of an electric shock may arise through the detector circuit, when one end of the LED tube 41 is connected to the contact cap 23 of the lighting fixture, but the other end is not. This is the case in spite of the fact that in the tube lighting fixture according to the embodiment of FIG. 4, the circuit-breaking switch S1 (or couplers S1 and S2) of the safety circuit is open and no voltage is supplied to the circuit board 32 through it (them).

Figure 5A:
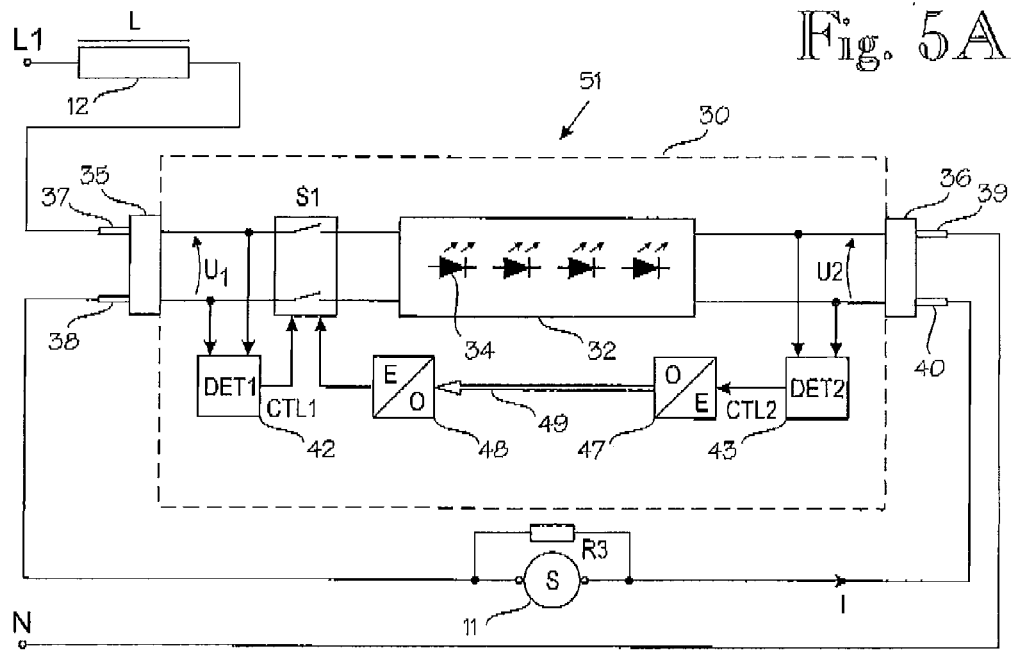
FIG. 5A is a schematic representation of a LED illuminating tube according to yet another exemplary embodiment of the invention as well as a circuit arrangement mounted on a fluorescent tube lighting fixture provided with a ballast-starter combination.

FIG. 5A is a schematic representation of a LED illuminating tube 51 according to yet another exemplary embodiment of the invention as well as a circuit arrangement mounted on a fluorescent tube lighting fixture provided with a ballast-starter combination, such as the lighting fixture 20 in FIG. 2. The LED tube 51 may be similar in mechanical and electric structure to the tube lamp 31 of FIG. 3A, 3B or 3C, for instance, with the exception that the LED tube 51 is also equipped with a safety circuit according to an embodiment of the invention to remove the risk of an electric shock to the person doing the installation. The components of the safety circuit may preferably be on the same printed board 32 or a corresponding structure as the LEDs 34 and the other current supply components 33. It should be noted that FIG. 5A shows schematically the contact pins (37, 38, 39, and 40) and the lighting fixture conductors connected to them. In practice, connecting conductors to the contact pins of the lamp takes place through contact caps 23 in tube supports 21 and 22 according to FIG. 2.

Figure 5B:
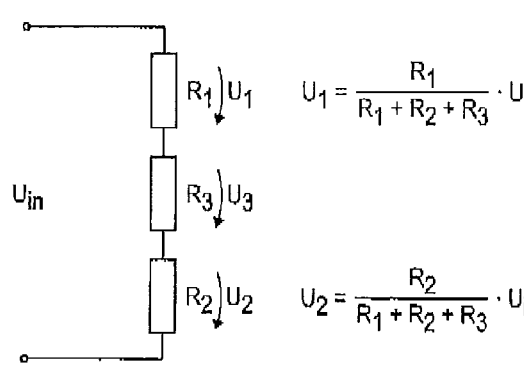
FIG. 5B shows an example of the dimensioning of resistors R1, R2 and R3 of FIG. 5A.

The LED tube 51 of FIG. 5A may be essentially similar to the LED tube 41 of the exemplary embodiment of FIG. 4A, and in FIGS. 4A and 5A, the same reference numbers indicate essentially same elements and functions, with the exception that in the LED tube 51 between the contact pins 37 and 38, a component R1 is connected which replaces the filament of the fluorescent tube electrode and through which current I runs. Correspondingly, at the other end of the LED tube 51 between the contact pins 39 and 40, a component R2 is connected which replaces the filament of the fluorescent tube electrode and through which current I runs. The components R1 and R2 are resistors, capacitors, inductances, or other corresponding components, or various combinations of these. In the connection arrangement, the starter of the lighting fixture 20 is removed and replaced by a component R3 having high resistance, whereby a small current I caused by the mains voltage runs through it. Alternatively, the component R3 may be positioned parallel to the starter, as illustrated in FIG. 5A. The component R3 may be a resistor, capacitor, inductance, or some other corresponding component, or a combination of these. The component R3 may be implemented by a casing and connectors corresponding in physical size to the starter 11 and, therefore, the component R3 can be positioned in the cap of the starter 11 in the lighting fixture 20. The values of these components R1, R2, and R3 are preferably dimensioned to high-resistance in such a manner that the current I running through them is substantially smaller than the filament current of a fluorescent tube. FIG. 5B shows an example of the dimensioning of the components R1, R2, and R3, when they are resistors. The resistors R1, R2, and R3 are connected in series between supply voltage Uin (in FIG. 5A, between phase voltage L1 and zero N). Voltage U1 (measured in FIG. 5A) forms over the resistor R1 and voltage U2 (also measured in FIG. 5A) forms over the resistor R2. Voltage U3 forms over the resistor R3. The values of voltages U1 and U2 can be determined by means of the equations of FIG. 5B. The resistances of the resistors R1, R2, and R3 can be selected to obtain require voltages U1 and U2 at a given supply voltage Uin. As is apparent to persons skilled in the art, R1, R2, and R3 shown in the equations can be replaced by symbols Z1, Z2, and Z3, when the components contain inductance and/or capacitance instead of or in addition to resistance.

This arrangement creates a situation where between the contacts 37 and 38 as well as 39 and 40, respectively, at both ends of the LED tube 51 (over the component R1 and R2, respectively), small voltage U1 and U2, respectively, is generated and can be used as detection voltage. The voltage detectors 42 and 43 detect voltages U1 and U2 in the same manner as heating voltages and control the circuit-breaking switch S1 with the control signals CTL1 and CTL2 in the same manner as in the embodiment of FIG. 4A, for example. This way, the LED tube 41 can be kept completely open (non-conducting) until the voltage detectors 42 and 43 have verified from voltages U1 and U2 that the tube 41 is installed reliably into its tube supports 21 and 22 in the lighting fixture 20. Similar to the example of FIG. 4A, in the example of FIG. 5A, the control signal CTL1 generated by the voltage detector 42 is taken as an electric control to the circuit-breaking switch S1 and the control signal CTL2 generated by the voltage detector 43 is taken to the circuit-breaking switch S1 through an optical link so as to reduce capacitive leakage currents from the control conductor to metal cooling structures, for example, such as to the tube portions 30B, 30D, and 30E in FIGS. 3B and 3C. Similarly, signal lines associated with the operation of the LED components 34 and/or the current control unit may be implemented with optical signal lines to reduce capacitive leakage currents.

Figure 5C:
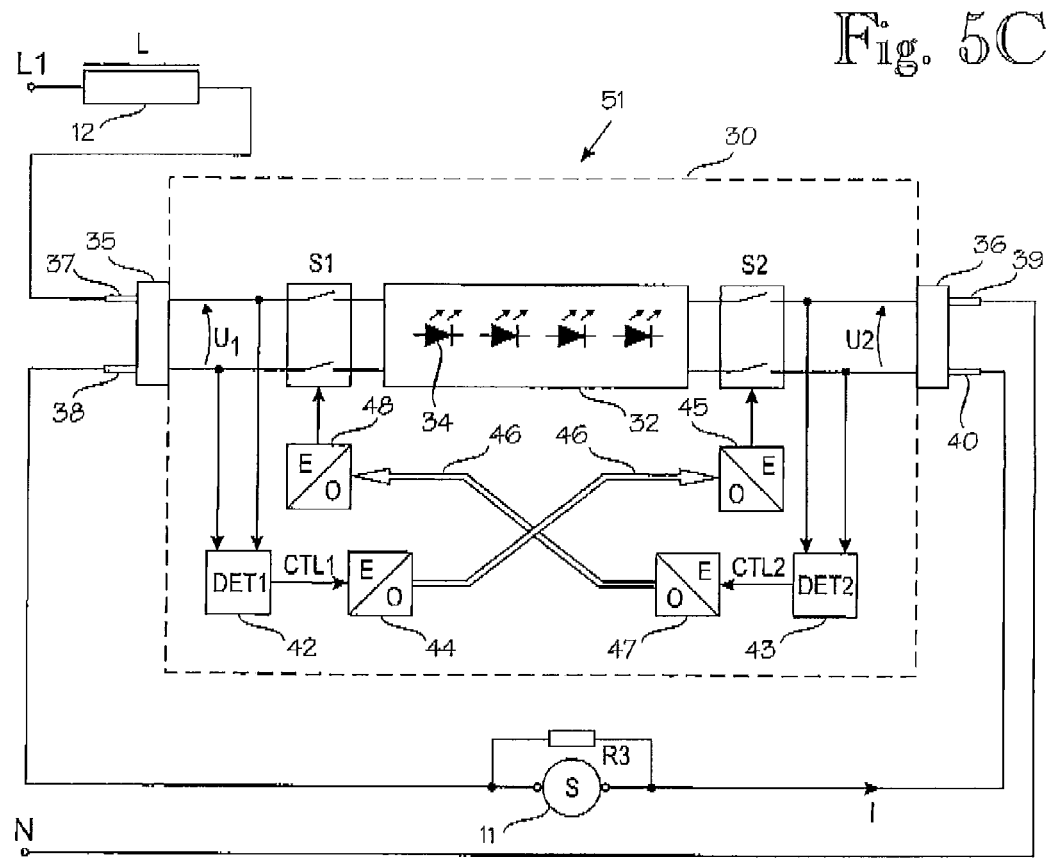
FIG. 5C is a schematic representation of a LED illuminating tube according to yet another exemplary embodiment of the invention that has a circuit-breaking switch at both ends of the LED tube and their control is cross-connected between the ends of the LED tube, as well as a connection arrangement mounted on a fluorescent tube lighting fixture provided with a ballast-starter combination.

FIG. 5C is a schematic representation of a LED tube according to an exemplary embodiment of the invention that is similar to that of the example in FIG. 5A, except that it has a circuit-breaking switch at both ends of the LED tube and their control is cross-connected between the ends of the LED tube. This cross-connection of control may be substantially similar to that of the example in FIG. 4B. In other words, the control signals CTL1 and CTL2 are taken to the circuit-breaking switches S2 and S1 through optical links. In FIGS. 4B, 5A, and 5C, the same reference numbers indicate essentially the same elements and functions.

The LED fluorescent tube 51 with the components R1 and R2 is also suitable for use with an electronic ballast that generates heating voltages directly. The high-resistance component R1 or R2 does not cause significant loss current from the low heating voltage. In some embodiments of the invention, the components R1 and R2 are both in series with at least one switch with which the components R1 and R2 can be connected between the contact pins and off, whereby the LED tube can be installed in accordance with the tube 51 or tube 41 depending on the installation site. The user may select switch positions by using actuators on the lids 35 and 36.

According to yet another embodiment, the LED tube is intended to replace a fluorescent tube with only one contact pin at each end (single pin tube). A tube such as this may be a cold cathode fluorescent tube, for example, in which the electrode has no preheating. For instance, the single pin version of the LED tube in FIG. 3A could only have the contact pins 37 and 38. The safety unit of the invention can also be applied to this type of single pin LED tube. It is then for instance possible to leave out the contact pins 38 and 40 and their connections from the LED tube of FIG. 4A. The voltage detectors 42 and 43 can monitor the voltages of the contact pins 37 and 39 and close both circuit-breaking switch S1 only if both detect voltage.

In all embodiments of the invention, the circuit-breaking switch S1 or S2 may be implemented with any switch structure or component that is capable of breaking a supply voltage circuit. The circuit-breaking preferably takes place bipolarly, as shown in the examples of FIGS. 4A to 4B and 5A to 5C. Examples of suitable circuit-breaking switches include electromechanical switches, such as relays, and semiconductor switches, such as transistors. In the examples of FIGS. 4A to 4B and 5A to 5C, the circuit-breaking switches S1 and S2 are connected between the contact pins 37 to 40 and other LED circuitry 32 on the circuit board 32, whereby they naturally efficiently prevent dangerous voltage from conducting from one end of the LED tube 41 or 51 to the other. However, the circuit-breaking switches S1 and S2 may alternatively reside at any point of the LED circuitry as long as they break the current path in such a way that prevents dangerous voltage from conducting from one end of the LED tube 41 or 51 to the other. However, as far as the advantage obtained from an optical link or cross-connection of control, i.e., reducing the capacitive leakage current, is concerned, it is more advantageous to have the circuit-breaking switches S1 and S2 as close as possible to the ends of the LED tube lighting fixture. Herein, the circuit-breaking switches are said to be at the end of the LED tube, when they are on a section of the tube that is closer to the end of the tube than its middle point. Generally, an optical link (line) provides the greater benefit, the longer the electric line to be replaced is.

The voltage detector 42 or 43 may be implemented using any circuit solution that in the presence of sufficient heating voltage U1 or U2, respectively, generates a control signal CTL1 or CTL2, respectively, such as a control voltage. The voltage detector 42 or 43 may be a relay or voltage comparator that obtains its operating voltage from heating voltage U1 or U2. Thus, it may also be part of the switch S1. The control through the LED tube may then be a measurement signal, such as voltage U1 or U2.

The electro-opto (E/O) converter 44 or 47 (electric-to-optical converter) may be implemented using a commercial circuit and/or a light emitting component, such as LED, incorporated into a voltage detector. The opto-electro (O/E) converter 45 or 48 (optical-to-electric converter) may be implemented using a commercial circuit and/or a light-controlled component, such as light emitting diode or light transistor, incorporated into the driver circuit of the switch S1 or S2, for instance. The converters may obtain their operating voltage from the adjacent voltage detectors, for example. Various suitable solutions for implementing the converters will be obvious to persons skilled in the art. The light line 48 or 48 is preferably implemented by optical fiber, but any optical transmission path can be used, such as an optical waveguide integrated on a circuit board.

Alternatively, the optical control line can be implemented by disconnecting the electrical control line from the live end with an opto-isolator or a corresponding component, which means that voltage causing stray capacitance does not enter the control line. This way, the stray capacitance and leakage current caused by control or measurement signals are avoided or at least reduced.

It is obvious to a person skilled in the art that, as technology advances, the basic idea of the invention may be implemented in many different ways. The invention and its embodiments are thus not restricted to the examples described above, but may vary within the scope and spirit of the claims.

The invention claimed is:

1. A LED tube comprising a translucent or fluorescent tube of substantially the shape and size of a fluorescence tube, inside which one or more LED components and a current control unit are installed and at each end of which there is at least one contact pin for connecting the light element mechanically and electrically to the tube supports of the fluorescence tube lighting fixture, wherein the LED tube has a safety unit arranged to connect electric power from the ends of the LED tube to the current control unit and LED components separately only after voltage fed from the corresponding tube support of the lighting fixture to said at least one contact pin has been detected at each end of the LED tube separately, and wherein the LED tube has at least one optical control line arranged to transfer at least one control or measurement signal associated with said safety unit from one end of the LED tube to the other, opposite end.

2. The LED tube as claimed in claim 1, wherein the safety unit comprises a switching mechanism on a current path between contact pins at different ends of the LED tube, and wherein said at least one optical control line is arranged to transfer at least one control or measurement signal associated with the control of said switching mechanism.

3. The LED tube as claimed in claim 1, wherein the safety unit comprises a switching mechanism in series on a current path between said at least one contact pin at the first end of the LED tube and the current control unit, and wherein said at least one optical control line is arranged to transfer the control or measurement signal associated with the control of said switching mechanism from the opposite, second end of the LED tube to the first end.

4. The LED as claimed in claim 3, wherein the safety unit comprises:
a first voltage detector connected to detect voltage at said at least one contact pin at the first end of the LED tube and to control said switching mechanism LED tube, and
a second voltage detector connected to detect voltage at said at least one contact pin at the second end of the LED tube and to control said switching mechanism at the opposite, first end of the LED tube, and said at least one optical control line is arranged to transfer a signal from said second voltage detection mechanism to said switching mechanism.

5. The LED tube as claimed in claim 1, wherein the safety unit comprises a switching mechanism in series on a current path at both ends of the LED tube between said at least one contact pin and the current control unit, and wherein the control of the switching mechanism is cross-connected in such a manner that voltage detection at one end of the LED tube is arranged to control the electrical power switching mechanism at the opposite end, and wherein said at least one optical control line is arranged to transfer the cross-connected control or measurement signals associated with the control of the switching mechanism between the ends of the LED tube.

6. The LED tube as claimed in claim 5, wherein said at least one optical control line comprises:
a first optical line arranged to transfer a voltage measurement or control signal of the connection from the first end of the LED tube to the opposite, second end; and
a second optical line arranged to transfer a voltage measurement or control signal of the connection from the second end of the LED tube to the opposite, first end.

7. The LED tube as claimed in claim 5, wherein the safety unit comprises:
a first and a second controlled switching mechanism at a first and at a second end of the LED tube, respectively, for supplying electric power to the current control unit and to the LED components;
a first voltage detector connected to detect voltage at said at least one contact pin at the first end of the LED tube;
a first optical line, with which the first voltage detector is connected to control said second switching mechanism at the opposite, second end of the LED tube;
a second voltage detector connected to detect voltage at said at least one contact pin at the second end of the LED tube; and
a second optical line, with which the second voltage detector is connected to control said first switching mechanism at the opposite, first end of the LED tube.

8. The LED tube as claimed in claim 1, wherein the safety unit is arranged to detect the heating voltage received from the tube holder of the fluorescence tube lighting fixture to the contact pins at each end of the LED tube.

9. The LED tube according to claim 1, further comprising:
two contact pins at each end of the tube;
wherein between the two contact pins a resistive, inductive or capacitive measuring component is connected at each end of the LED tube to generate a current path between the contact pins; and
wherein the safety unit is arranged to detect low voltage over said measuring component at each end of the LED tube, which low voltage results from current passing through the measuring component and generated with a high-resistance component connected in place of or beside a starter in the fluorescence tube lighting fixture of a ballast-starter type.

10. The LED tube as claimed claim 1, wherein said at least one optical control line is also arranged to transfer a signal associated with the control of the LED components and current control unit.

11. The LED tube as claimed in claim 1, wherein said at least one optical control line comprises:
an electrical-to-optical converter that converts the electrical signal to be transferred to an optical signal;
an optical-to-electrical converter that converts the transferred optical signal to an electrical signal; and
an optical wave guide mounted between the electro-optical and opto-electrical converters.

12. The LED tube as claimed in claim 1, wherein said at least one optical control line comprises an opto-isolator or a corresponding component that is arranged to isolate an electrical control wire from the live end.

13. The LED tube as claimed in claim 1, wherein part of the tube coating of the LED tube is made of metal or comprises a metal structure for providing cooling.

14. A lighting fixture arrangement comprising a lighting fixture which is intended for a fluorescent tube and in which a LED tube is installed, said LED tube comprising a translucent or fluorescent tube of substantially the shape and size of a fluorescence tube, inside which one or more LED components and a current control unit are installed and at each end of which there is at least one contact pin for connecting the light element mechanically and electrically to the tube supports of the fluorescence tube lighting fixture, wherein the LED tube has a safety unit arranged to connect electric power from the ends of the LED tube to the current control unit and LED components separately only after voltage fed from the corresponding tube support of the lighting fixture to said at least one contact pin has been detected at each end of the LED tube separately, and wherein the LED tube has at least one optical control line arranged to transfer at least one control or measurement signal associated with said safety unit from one end of the LED tube to the other, opposite end.

15. The lighting fixture arrangement as claimed in claim 14, in which the lighting fixture comprises a high-frequency electronic ballast.

16. The lighting fixture arrangement as claimed in claim 14, wherein the safety unit comprises a switching mechanism on a current path between contact pins at different ends of the LED tube, and wherein said at least one optical control line is arranged to transfer at least one control or measurement signal associated with the control of said switching mechanism.

17. The lighting fixture arrangement as claimed in claim 14, wherein the safety unit comprises a switching mechanism in series on a current path between said at least one contact pin at the first end of the LED tube and the current control unit, and wherein said at least one optical control line is arranged to transfer the control or measurement signal associated with the control of said switching mechanism from the opposite, second end of the LED tube to the first end.

18. The lighting fixture arrangement as claimed in claim 14, wherein the safety unit comprises:
a first voltage detector connected to detect voltage at said at least one contact pin at the first end of the LED tube and to control said switching mechanism LED tube; and
a second voltage detector connected to detect voltage at said at least one contact pin at the second end of the LED tube and to control said switching mechanism at the opposite, first end of the LED tube, and said at least one optical control line is arranged to transfer a signal from said second voltage detector to said switching mechanism.

19. The lighting fixture arrangement as claimed in claim 14, wherein the safety unit comprises a switching mechanism in series on a current path at both ends of the LED tube between said at least one contact pin and the current control unit, and wherein the control of the switching mechanism is cross-connected in such a manner that voltage detection at one end of the LED tube is arranged to control the electrical power switching mechanism at the opposite end, and wherein said at least one optical control line is arranged to transfer the cross-connected control or measurement signals associated with the control of the switching mechanism between the ends of the LED tube.

20. The lighting fixture arrangement as claimed in claim 14, wherein said at least one optical control line comprises:
a first optical line arranged to transfer a voltage measurement or control signal of the connection from the first end of the LED tube to the opposite, second end; and
a second optical line arranged to transfer a voltage measurement or control signal of the connection from the second end of the LED tube to the opposite, first end.

* * * * *